| United States Patent [19] | [11] Patent Number: 4,803,087 |
| --- | --- |
| Karinen | [45] Date of Patent: Feb. 7, 1989 |

[54] COMPOSITION AND METHOD FOR PRODUCING VITAMIN-ENRICHED MILK

[75] Inventor: Timothy J. Karinen, Round Lake Beach, Ill.

[73] Assignee: PPG Industries, Inc., Pittsburgh, Pa.

[21] Appl. No.: 76,109

[22] Filed: Jul. 21, 1987

[51] Int. Cl.$^4$ .................. A23L 1/303; A23L 9/20; A23L 5/00

[52] U.S. Cl. .................... 426/73; 252/312; 426/311; 426/580; 426/585; 426/602

[58] Field of Search ............... 426/73, 311, 585, 587, 426/602, 580; 252/312

[56] References Cited

U.S. PATENT DOCUMENTS 2,335,275 11/1943 Hausser et al. ............... 426/73
3,261,691 7/1966 Erickson ..................... 252/312
3,695,889 10/1972 Ingerson ..................... 426/602
4,310,561 1/1982 Buddemeyer .................. 426/602

OTHER PUBLICATIONS

McCutcheon's Emulsifiers and Detergents, 1981, pp. 11 and 12, MC Publishing Co., N.J.

Primary Examiner—Donald E. Czaja
Assistant Examiner—Helen Pratt
Attorney, Agent, or Firm—Irwin M. Stein

[57] ABSTRACT

Described is a method for enriching milk with vitamin A and/or D by adding to raw milk an aqueous emulsion of edible oil, e.g., soybean oil, a source of vitamin A and/or D, and an emulsifying agent that is a combination of polyoxyethylene sorbitan monooleate and glycerol monooleate.

24 Claims, No Drawings

COMPOSITION AND METHOD FOR PRODUCING VITAMIN-ENRICHED MILK

DESCRIPTION OF THE INVENTION

Physical processing of raw milk received from dairy farms at the dairy plant is fairly uniform. The major physical processing steps include: clarification, cream separation, adjustment of butterfat content, pasteurization, vacuum removal of off-flavors, homogenization and packaging. The aforesaid processing steps are not performed usually in a totally closed system due to the addition of various additives and fortifying agents during such processing. For example, it is commonplace to enrich milk with vitamin A and vitamin D. Vitamin A is commonly added to milk dispersed or dissolved in an oil carrier containing an emulsifying agent(s). This oil-vitamin-emulsifier additive may be added to milk fluid prior to pasteurization or to evaporated milk prior to homogenization. Addition of the vitamin-containing additive earlier in the milk processing process, e.g., prior to cream separation, is unsatisfactory for the reason that vitamins such as A and D are oil-soluble and are partially removed during separation of the cream from the milk fluid. Further, there is a tendency for the vitamin-containing additive remaining with the milk fluid to separate during other processing stages, thereby resulting in the formation of a two-phase system and milk containing less than the desired levels of vitamin enrichment.

It is desirable to process milk in a closed system to avoid contamination with bacteria and other microorganisms from external sources. It is now been discovered that if vitamin A and/or vitamin D are introduced into raw milk or clarified raw milk as an aqueous emulsion, the vitamin(s) thereby introduced remain with the milk fluid throughout its processing, i.e., the vitamin additive does not phase separate and is not removed with milk fat components of the milk fluid during, for example, cream separation.

In accordance with an embodiment of the present invention, an aqueous emulsion of (i) edible oil, such as vegetable oil, (ii) a source of at least one vitamin selected from the group consisting of vitamin A, vitamin D and mixtures of vitamins A and D, and (iii) an emulsifying amount of an emulsifying agent is added to raw or clarified milk. The emulsifying agent is a combination of (1) a member selected from the group consisting of food grade polyoxyethylene sorbitan oleates, polyoxyethylene sorbitan stearates and mixtures of such polyoxyethylene sorbitan acid esters, and (2) a member selected from the group consisting of food grade oleic acid monoesters of glycerol, sorbitol and sucrose, polyglycerol esters of edible fatty acids, polyoxyethylene glycerates, and mixtures thereof. The weight ratio of the emulsifiers of group (1) to the emulsifiers of group (2) may vary between about 2:5 and about 5:2.

DETAILED DESCRIPTION OF THE INVENTION

Milk is a good source of vitamin A; however, the content of this vitamin in milk is affected by the type of feed consumed by the dairy cow. Consequently, it is customary to enrich milk with sufficient vitamin A so that the milk contains not less than 2000 International Units (IU) of the vitamin per quart. Milk is not a rich source of vitamin D. Consequently it is also customary to enrich milk by adding to of vitamin D in amount such that the milk contains not less than 400 IU of vitamin D per quart. Vitamin A has been introduced into milk as a blend comprising an edible oil carrier, e.g., a vegetable oil, a source of vitamin A and an emulsifying agent(s). This blend is a solution or dispersion of the components since all are organic in charactar. Vitamin D is commonly added to milk in its crystalline form.

In accordance with the present invention, an oil-containing blend of vitamin(s) used to fortify milk is emulsified in an aqueous medium, e.g., water, and then mixed with raw milk. The emulsion may be Prepared by heating the mixture of carrier oil, emulsifier(s) and vitamin(s) source until a homogeneous solution or dispersion is formed. This solution (referred to hereinafter as the oil blend) is mixed with an aqueous medium, e.g., water, suitable for use in foods and the resulting mixture subjected to sufficient shear force to homogenize or emulsify the oil blend in the aqueous medium. Water used to form the emulsion should be in amounts sufficient to be the continuous or dispersing phase of the aqueous emulsion. Similarly, the oil blend is the discontinuous or dispersed phase. While the relative amounts of water and oil blend may vary, the amount of water used may commonly vary between about 50 and about 90 weight percent, basis total weight of the emulsion. Accordingly, the amount of oil blend in the emulsion will vary between about 10 and about 50 weight percent, e.g., between about 30 and 45 weight percent.

In a particular embodiment, the carrier oil is heated to about 65° C.–85° C. and the emulsifier(s) and vitamin source added to the carrier oil. The mixture is agitated at such temperatures for a time sufficient to prepare a homogenous solution, e.g., about 30–60 minutes. This oil blend is then mixed with water, which has also been heated to about 60° C.–85° C. The resulting oil/water mixture may be agitated at such temperatures for a time sufficient to disperse the oil blend in the water. Subsequently, the oil/water mixture is cooled to about 50° C. and homogenized, e.g., at pressures of from about 4,000–5,500 pounds per square inch (psi) thereby to form a stable oil in water emulsion. Homogenization may be performed in a conventional homogenizer or colloid mill.

Carrier oils that may be used with the vitamin source are edible oils approved for use in foods. Typically, the oil will be a vegetable oil selected from the group consisting of corn oil, canola oil, soybean oil, coconut oil, cottonseed oil, peanut oil, sunflower oil, palm oil, safflower oil, olive oil, and sesame seed oil, and mixtures of such vegetable oils. As used herein, the term vegetable oil, is intended to mean an edible oil extracted from the seeds, fruit or leaves of plants. The amount of carrier oil used with the vitamin source may vary and may represent between about 60 and 70 weight percent of the oil blend. In the aqueous emulsion, the edible oil may be present in amounts of from about 10 to about 40, e.g., 20 to 30, usually 24 to 26, weight percent.

Vitamins commonly added to milk are vitamins A and D. These vitamins are commercially available in various synthetic forms. As used harein, the term vitamin A is intended to mean vitamin $A_1$, a mixture of vitamin $A_1$ and $A_2$, and vitamin A active substances, such as the provitamin A's, carotene and cryptoxanthin. As used herein, the term vitamin D is intended to include vitamin $D_2$ and/or vitamin $D_3$, which are the biologically active forms of vitamin D, the provitamin D's and mixtures of such active forms. Vitamin A is commercially available in synthetic form as vitamin A acetate, vitamin A propionate and vitamin A palmitata. Vitamin D is available commercially in microcrystalline form or as a concentrate.

The amount of vitamin A and/or D incorporated into the oil blend may vary. Typically the concentration of vitamin(s) in the oil blend will be premised upon the amount of aqueous emulsion of the oil blend that is to be added to milk to provide (in combination with the naturally occurring vitamin(s) present in the milk) the desired levels of such vitamins. In the case of vitamin A, such level is not less than 2000 IU of vitamin A per quart of milk. Similarly, in the case of vitamin D, such level is not less than 400 IU of vitamin D per quart. Generally, the vitamin content of the oil blend may be between about 2 and about 10 weight percent, and may be between about 0.5 and about 5, e.g., 2 to 4, weight percent of the aqueous emulsion. Since the relative amounts of vitamin A and vitamin D added to any given supply of raw milk may vary, it may not be efficient to form an aqueous emulsion of both of the vitamins. Hence, it is contemplated that separate aqueous emulsions be prepared, i.e., an aqueous emulsion of vitamin A and a separate aqueous emulsion of vitamin D. Such emulsions may then be added separately to raw milk in the amounts required for each to prepare milk containing the minimum established vitamin requirements for milk.

The emulsifier(s) used to form the aqueous emulsion are those approved for use in food products. In particular, the combination of (1) a polyoxyethylene sorbitan acid ester, e.g., oleate and/or stearate and (2) a member selected from oleic acid monoesters of glycerol, sorbitol and sucrose, polyglycerol esters of edible fatty acids, and Polyoxyethylene glycerates as emulsifying materials are particularly useful for preparing the aqueous emulsion of the oil blend described herein. The weight ratio of the emulsifiers of group (1) to the emulsifiers of group (2) in the oil blend may vary from about 2:5 to about 5:2, e.g., about 1:1.

Polyoxyethylene sorbitan oleates are commercially available under the designations polysorbate 80 and polysorbate 85. Polysorbate 80 (polyoxyethylene (20) sorbitan monooleate) consists of approximately 97 Percent of a mixture of the esters of oleic acid (principally the monoester) with sorbitol (its mono- and di-anhydrides), which is condensed with approximately 20 moles of ethylene oxide per mole of sorbitol. It may be prepared by reacting oleic acid (usually containing associated fatty acids) with sorbitol to yield a product with a maximum acid number of 7.5 and a maximum water content of 0.5 percent, which is then reacted with ethylane oxide. Polysorbate 85 is polyoxyethylene (20) sorbitan trioleate and may be prepared in a similar manner except that the product prior to ethoxylation will be the triester.

Polyoxyethylene sorbitan stearates are commercially available under the designations polysorbate 60 and polysorbate 65. Polysorbate 60 (polyoxyethylene (20) sorbitan monostearate) consists of approximately 97 percent of a mixture of the esters of stearic acid (principally the monoester) with sorbitol (its mono- and dianhydrides), which is condensed with approximately 20 moles of ethylene oxide per mole of sorbitol. It may be manufactured by reacting stearic acid (usually containing associated fatty acids, chiefly palmitic) with sorbitol to yield a product with a maximum acid number of 10 and a maximum water content of 0.2 percent, which product is then reacted with ethylene oxide. Polysorbate 65 (polyoxyethylene (20) sorbitan tristearate) is a mixture of polyoxyethylene ethers of mixed stearic acid esters of sorbitol anhydrides and related compounds. It may be manufactured by reacting stearic acid (usually containing associated fatty acids, chiefly palmitic) with sorbitol to yield a product with a maximum acid number of 15 and a maximum water content of 0.2 percent, which product is then reacted with ethylene oxide.

Glycerol monooleate is also commercially available and is produced by the alcoholysis of oleic acid (or naturally occurring triglycerides) with glycerol. The product is a mixture of mono-, di- and tri-esters, which is predominantly the monoester and diester. Sorbitol monooleate and sucrose monooleate may be prepared by esterification of sorbitol and sucrose with edible fatty acids, e.g., oleic acid or mixtures of oleic acids and associated fatty acids.

Polyglycerol esters of edible fatty acids are the partial and complete esters of edible saturated and unsaturated fatty acids, e.g., $C_8$–$C_{18}$ monocarboxylic acids such as caprylic, capric, lauric, myristic, palmitic, oleic and stearic acids, with glycerol and derivatives of polyglycerols. They may be prepared by direct esterification and transesterification reactions. Commonly, they are prepared from corn oil, cottonseed oil, lard, palm oil from fruit, peanut oil, safflower oil, sesame oil, soybean oil and tallow.

Polyoxyethylene glycerates are ethoxylated mono- and diglycerides. Polyglycerate 60 (polyoxyethylene (20) mono- and diglyceride of fatty acid) is an example of such a material and is commercially available. They may be manufactured by glycerolysis of edible fats primarily composed of stearic, palmitic and myristic acids, or by direct esterification of glycerol with a mixture of primarily staaric, palmitic and myristic acids, i.e., $C_{14}$–$C_{18}$ monocarboxylic acids, to yield a product with less than 0.3 acid number and less than 0.2 percent water, which is then reacted with ethylene oxide.

The amount of emulsifier(s) used to prepare the aqueous emulsion described herein, is that amount sufficient to provide a stable aqueous emulsion of the oil blend, i.e., an emulsifying amount. Typically, the emulsifier(s) will be present in amounts of from about 20 to about 35 weight percent in the oil blend, and in amounts of from about 5 to about 15 weight percent, e.g., 7 to 12, usually 8 to 10, weight percent, in the aqueous emulsion.

As used herein, the term raw milk is intended to mean milk to be processed at a commercial dairy plants, and includes milk as received from the farm or milk which has been clarified, i.e., milk from which sediment has been removed. For example, raw milk includes the milk fluid that is subsequently processed to saleable milk and milk dairy products ( Prior to the cream separation, pasteurization and homogenization stages of the milk treatment process.

The present invention is more particularly described in the following example, which is intended as illustrative only, since numerous modifications and variations therein will be apparent to those skilled in the art.

EXAMPLE

Into a suitable container were placed 250 grams of soybean oil, 45 grams of polyoxyethylene sorbitan monooleate, 45 grams of glycerol monooleate, 20 grams of glycerin and 30 grams of a vitamin A palmitate concentrate. This mixture was stirred and heated to about 65° C. The resulting oil blend was added to 610 grams of water having a temperature of about 55° C. The resulting oil blend-water mixture was cooled to 40° C. and passed through a laboratory homogenizer under a pressure of 5,500 pounds per square inch to form an aqueous emulsion of the oil blend.

The aqueous emulsion was diluted with water to 1.6 percent solids. A sample of the diluted emulsion was placed in a centrifuge tube and spun at 5,000 rpm for 10 minutes. The integrity of the emulsion was observed to have been maintained. The surface of the sample was free of oil and cream. There was also observed no settling or water-rich phase separation on the bottom portion of the sample.

A further sample of the diluted emulsion was diluted with water to 0.8 percent solids, frozen and then thawed. Only pin drops of oil were evident on the surface of the sample.

Another sample of the diluted emulsion was diluted with water to 0.8 percent solids and placed in an oven at 37° C. for 100 hours. Only Pin drops of oil were apparent on the sample surface.

Although the present invention has been described with reference to specific details of certain embodiments thereof, it is not intended that such details should be regarded as limitations upon the scope of the invention, except as and to the extent that they are included in the accompanying claims.

I claim:

1. A method for enriching milk with vitamins, comprising adding to raw milk an aqueous emulsion of (i) edible oil, (ii) a source of at least one vitamin selected from the group consisting of vitaa:i' A, vitamin D and mixtures of vitamins A and D, apd (iii) an emulsifying amount of an emulsifying agent that is a combination of (a) a member selected from the group consisting of food grade polyoxyethylene sorbitan oleates, polyoxyethylene sorbitan stearates and mixtures thereof, and (b) a member selected from the group consisting of food grade oleic acid monoesters of glycerol, sorbitol and sucrose, polyglycerol esters of edible fatty acids, polyoxyethylene glycerates and mixtures thereof, the weight ratio of (a):(b) being from about 2:5 to about 5:2.

2. The method of claim 1 wherein the edible oil is a vegetable oil selected from the group consisting of corn oil, soybean oil, coconut oil, cottonseed oil, peanut oil and mixtures of such vegetable oils.

3. The method of claim 1 wherein the vitamin A source is a synthetic vitamin A acetate, vitamin A propionate or vitamin A palmitate, and the vitamin D source is synthetic crystalline vitamin D.

4. The method of claim 2 wherein the vitamin A source is a synthetic vitamin A acetate, vitamin A propionate or vitamin A palmitate, and the vitamin D source is synthetic crystalline vitamin D.

5. The method of claim 4 wherein the weight ratio of (a):(b) is about 1:1.

6. The method of claim 4 wherein the emulsifying agent is a combination of (1) polyoxyethylene sorbitan monooleate and (b) glycerol monooleate.

7. The method of claim 5 wherein the emulsifying agent is a combination of (a) polyoxyethylene sorbitan monooleate and (b) glycerol monooleate.

8. The method of claim 1 wherein: the edible oil is present in the emulsion in amounts of from about 10 to about 40 weight percent, the vitamin source is present in the emulsion in amounts of from about 0.5 to 5 weight percent, and the emulsifying agent is present in the emulsion in amounts of from about 5 to about 15 weight percent.

9. The method of claim 4 wherein: the edible oil is present in the emulsion in amounts of from about 20 to about 30 weight percent, the vitamin A source is present in the emulsion in amounts of from about 2 to about 4 weight percent, and the emulsifying agent is present in the emulsion in amounts of from about 7 to about 12 weight percent.

10. The method of claim 6 wherein: the edible oil is present in the emulsion in amounts of from about 20 to about 30 weight percent, the vitamin A source is present in the emulsion in amounts of from about 2 to about 4 weight percent, and the emulsifying agent is present in the emulsion in amounts of from about 7 to about 12 weight percent.

11. The method of claim 5, wherein the edible oil is selected from corn oil and soybean oil, and is present in the emulsion in amounts of from about 24 to about 26 weight percent, the vitamin source is a synthetic vitamin A acetate or palmitate and is present in the emulsion in amounts of from about 2 to about 4 weight percent, and the emulsifying agent is a combination of (a) polyoxyethylene sorbitan monooleate and (b) glycerol monooleate and is present in the emulsion in amounts of from about 8 to about 10 weight percent.

12. The method of claim 8 wherein the vitamin source is a source of vitamin A.

13. The method of claim 10 wherein the vitamin source is a source of vitamin A.

14. the method of claim 4 wherein the emulsifying agnet is a combination of (a) polyoxyethylene sorbitan monooleate, polyoxyethlyene sorbitan monostearate and mixtures thereof, and (b) glycerol monooleate, sorbitol monooleate, and polyglycerol esters of edible C-$C_{18}$ monocarboxylic acids.

15. A composition useful for incorporation into raw milk consisting essentially of an aqueous emulsion of (i) from about 10 to about 40 weight percent edible oil, (ii) between about 0.5 and about 5 weight percent of a source of at least one vitamin selected from the group consisting of vitamin A, vitamin D and a mixture of vitamin A and vitamin D, and (iii) from about 5 to about 15 weight percent of an emulsifying agent that is a combination of (a) a member selected from the group consisting of food grade polyoxyethylene sorbitan oleates, polyoxyethylene sorbitan stearates and mixtures thereof, and (b) a member selected from the group consisting of food grade oleic acid monoesters of glycerol, sorbitol and sucrose, polyglycerol esters of edible fatty acids, and mixtures thereof, the weight ratio of (a):(b) being from about 2:5 to about 5:2.

16. The composition of claim 15 wherein the edible oil is a vegetable oil selected from the group consisting of corn oil, soybean oil, coconut oil, cottonseed oil, peanut oil and mixtures of such vegetable oils.

17. The composition of claim 15 wherein the vitamin A source is a synthetic vitamin A acetate, vitamin A propionate or vitamin A palmitate, and the vitamin D source is synthetic crystalline vitamin D.

18. The composition of claim 16 wherein the vitamin A source is a synthetic vitamin A acetate, vitamin A propionate or vitamin A palmitate, and the vitamin D source is synthetic crystalline vitamin D.

19. The composition of claim 15 wherein the emulsifying agent is a combination of (1) polyoxyethylene sorbitan monooleate and (b) glycerol monooleate.

20. The composition of claim 18 wherein the emulsifying agent is a combination of (a) polyoxyethylene sorbitan monooleate and (b) glycerol monooleate.

21. The composition of claim 20 wherein: the edible oil is present in the emulsion in amounts of from about 20 to about 30 weight percent, the vitamin source is present in the emulsion in amounts of from about 2 to about 4 weight percent, and the emulsifying agent is present in the emulsion in amounts of from about 7 to about 12 weight percent.

22. The composition of claim 21 wherein the weight ration of (a):(b) is about 1:1.

23. The composition of claim 15, wherein the edible oil is selected from corn oil and soybean oil, and is present in the emulsion in amounts of from about 24 to about 26 weight percent, the vitamin source is a synthetic vitamin A acetate or palmitate and is present in the emulsion in amounts of from about 2 to about 4 weight percent, and the emulsifying agent is a combination of (a) polyoxyethylene sorbitan monooleate and (b) glycerol monooleate and is present in the emulsion in amounts of from about 8 to about 10 weight percent.

24. The composition of claim 23 wherein the weight ration of (a):(b) is about 1:1.

* * * * *

UNITED STATES PATENT AND TRADEMARK OFFICE
CERTIFICATE OF CORRECTION

PATENT NO. : 4,803,087

DATED : Feb. 7, 1989

INVENTOR(S) : Timothy J. Karinen

It is certified that error appears in the above-identified patent and that said Letters Patent is hereby corrected as shown below:

Claim 1, line 31, "enriching,milk" should be --enriching milk--;

line 34, "vitaa:i'" should be --vitamin--;

line 35, "apd" should be --and--;

Lines 42-43, "polyoxyethylene glycerates" should be deleted.

Signed and Sealed this

Eleventh Day of September, 1990

Attest:

HARRY F. MANBECK, JR.

*Attesting Officer*      *Commissioner of Patents and Trademarks*